April 3, 1951   G. A. LYON   2,547,031
WHEEL COVER
Filed Feb. 9, 1946
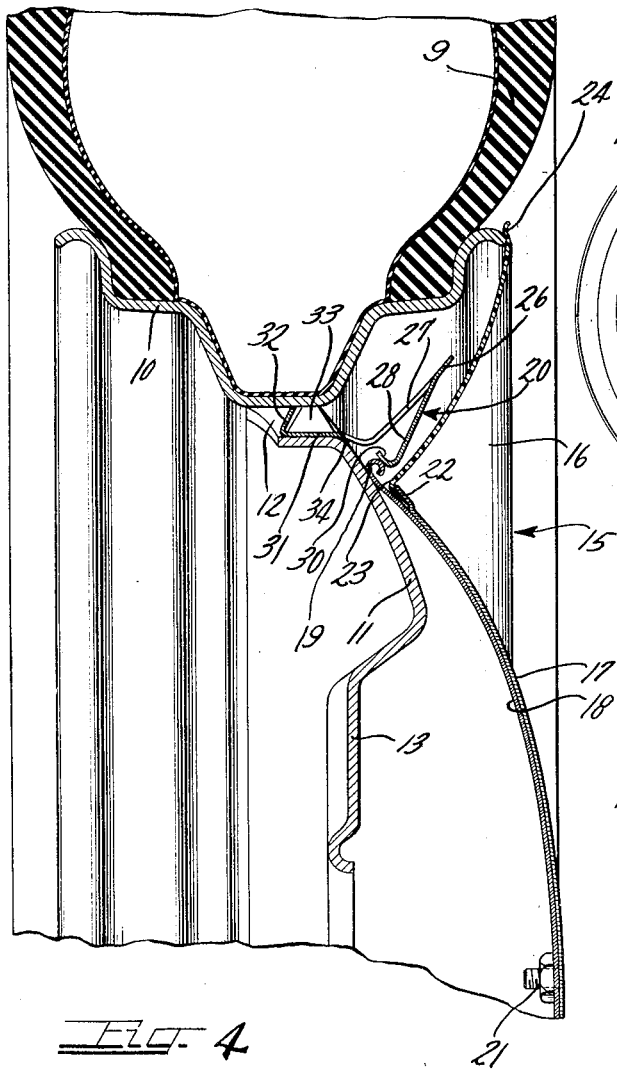
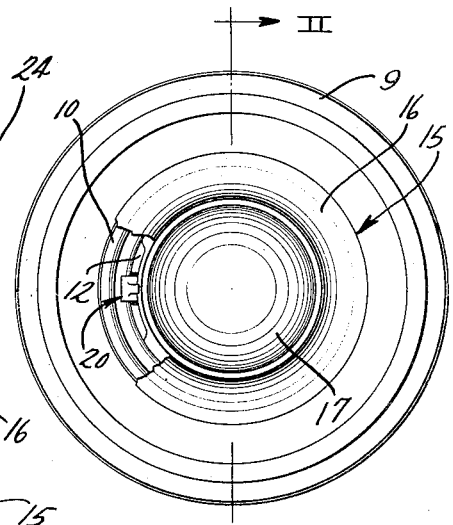
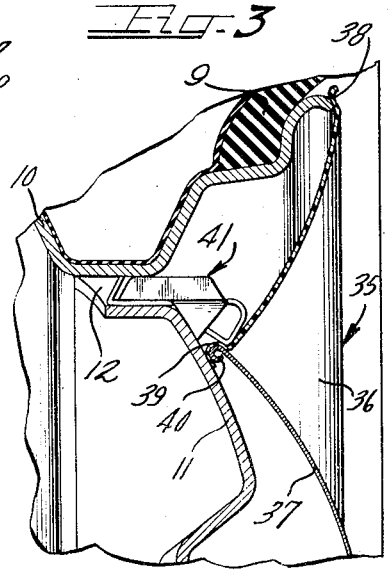
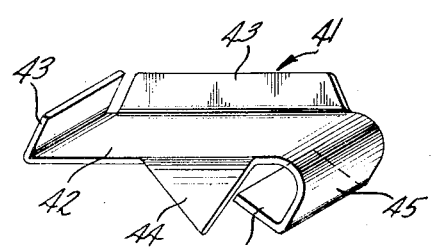
Inventor
GEORGE ALBERT LYON Patented Apr. 3, 1951

2,547,031

UNITED STATES PATENT OFFICE 2,547,031

WHEEL COVER

George Albert Lyon, Allenhurst, N. J.

Application February 9, 1946, Serial No. 646,636

11 Claims. (Cl. 301—37)

This invention relates to a cover structure for a wheel, and more particularly to novel retention means between the cover and parts of the wheel.

An object of this invention is to provide an improved and simple form of retaining means for holding an ornamental cover on an automobile wheel.

Another object of this invention is to provide a spring clip for use in retaining a cover on a wheel, which can be readily inserted in the wheel opening, and which, by reason of its construction, will resist cocking or tipping and will also preclude the clip from being pushed too far into the wheel opening when it is being mounted on the wheel.

Still another object of this invention is to provide a novel wheel cover for cooperation with the retaining means, and which cover may be made of composite plastic and metal parts wherein the parts may be uniquely interlocked adjacent their point of engagement with the cover retaining means.

In accordance with the general features of this invention, there is provided in a cover structure for a wheel including tire rim and body parts, with spaced openings therebetween, and a circular cover for disposition over an outer side of the wheel having a shoulder on the rear side thereof, cover retaining means cooperable with said wheel parts at said openings, comprising a plurality of spring clips each extending axially into the opening and formed with an inclined extremity for wedged engagement with the wheel parts in the openings as well as with a side flange for resisting tilting or cocking of the clip, the axially outer portion of the clip being formed to bear against the body part so as to limit axial movement of the clip in the opening as well as with a free resilient finger for tensioned engagement with the shoulder of the cover.

In accordance with still other features of this invention, the retaining means may take either one of two forms, in one of which the means comprise tangs and in the other of which the means comprise turned inclined outer extremities.

Another feature of the invention relates to the manner of construction of the cover itself, and more particularly to the manner in which plastic and metal parts are interconnected with each other adjacent the area of engagement of the cover by the retaining means.

Other objects and features of this invention will more fully appear from the following detail description taken in connection with the accompanying drawings which illustrate several embodiments thereof and in which Figure 1 is a side view of a wheel structure embodying a cover of this invention, and wherein the cover is broken away to show a clip in one of the wheel openings;

Figure 2 is an enlarged fragmentary cross sectional view taken on the line II—II of Figure 1, looking in the direction indicated by the arrows;

Figure 3 is a fragmentary cross-sectional view similar to Figure 2 showing a modified form of structure; and Figure 4 is an isometric view of the modified form of clip shown in Figure 3.

As shown on the drawings:

The reference character 9 designates generally a conventional pneumatic tire and tube assembly, supported in the usual way upon a conventional multi-flanged drop-center type of tire rim 10, which is in turn carried by a load-bearing or body part 11. The load-bearing part 11 comprises a dished stamping which is attached at spaced intervals to the base flange of the rim 10 leaving spaced openings 12 between the rim and body part in a manner well known to those familiar with this art.

The body part is also provided with a central depressed bolt-on flange 13 by means of which the wheel may be fastened in the usual way by cap screws or bolts (not shown) to a part on an axle of a wheel.

Cooperable with this wheel assembly is a cover designated generally by the reference character 15 and which embraces the features of this invention. This cover, as is well known, must be detachable so as to enable access to the central wheel bolts (not shown) when it is desired to remove the wheel from the axle.

The cover includes an outer annular plastic ring 16 and a central hub cap simulating portion comprising two nested metallic stampings or shells 17 and 18. The plastic ring 16 may be made of any suitable resiliently pliable material, such, for example, as ethyl cellulose, cellulose acetate or vinyl resins, whereas the central metallic shells 17 and 18 may comprise stampings from sheet steel.

It will be perceived from Figure 2 that the inner nested shell 18 extends radially beyond the outer margin of the outer shell 17 and is formed into a turned edge 19 which comprises a shoulder on the cover for cooperation with spring retaining clips 20. This shoulder 19 is adapted to be wedged against the body part by the resilient force of the clips 20 to be hereinafter described.

The two shells 17 and 18 may be secured together in any suitable manner as, for example, by means of a bolt and nut 21 at the center of the assembly. This same fastening means may be used to hold an emblem on the center of the nested shells which in reality correspond to a hub cap on a wheel.

The outer radial margin of the outer shell 17 is slightly offset at 22 to provide a space between this offset 22 and the inner shell 18, in which space a turned radially inner margin 23 of the plastic ring is adapted to be inserted and retained. In this manner the clamping of the two nested shells 17 and 18 together also result in the turned inner margin 23 of the plastic ring 16 being clamped to the nested shells.

The radially outer margin of the plastic ring 16 may be slightly turned at 24 so as to overhang an outer edge of the tire rim part 10 in close proximity to the outer side wall of the tire 9. The ring 16 is of such convex curvature that it extends generally radially and axially inwardly from the turned edge 24 to the turned inner edge 23 directly opposite the body part 11. The configuration of this ring 16 as well as its radial extent, is such that in use it appears to constitute a continuation of the side wall of the tire. This illusion can be further enhanced by giving the ring 16 a white external finish in which event it appears to constitute a white side wall part of the tire in which the tire appears to extend clear down to the nested shells 17 and 18.

The spring clips 20 may be of any suitable number, such, for example, as three to five, and are identical in construction. Each of them includes an outer resilient free portion 26 located behind the ring 16 and having punched therein an opening 27 from which the material is pressed outwardly to form a finger or tang 28 having a turned extremity 30 adapted to have tensioned engagement with the turned edge or shoulder 19 on the cover assembly.

The clip includes an axially extending portion 31, the rear end of which is formed into an inclined leg 32 adapted to be wedged between the rim and body parts in the wheel opening so as to hold the clip against removal from the wheel. The axially extending portion may be provided with one or more side flanges 33 likewise wedged in the opening and which assists in preventing tilting or cocking of the spring clip in its use.

The junction of the axially extending portion 31 and the free portion 26 is slightly turned axially inward at 34 so as to bear against the curved outer portion of the body part 11. This is advantageous in that it enables the clip itself to limit the extent to which it can be pushed into the wheel opening when it is being mounted on the wheel.

In the application of the cover 15 to the wheel it is first placed over the outer side of the wheel and is then pressed axially toward the body part until its shoulder or edge 19 strikes the bent ends 30 of the resilient tangs 28 thereby causing these tangs 28 to yield until the turned edge 19 has snapped behind the turned ends 30. When in this position the tangs 28 are exerting resilient pressure against the turned edge 19, forcing it tightly against the body part 11. This is due to the fact that the tangs 28 do not completely return to their normal positions after having been deflected by the camming of the same radially outwardly under the pressure of the edge 19 thereagainst. In this manner the cover can be tightly held on the body of the wheel with the outer edge 24 of the plastic ring 16 in contact with the outer edge of the rim part 10.

To remove the cover, the operator flexes a portion of the plastic ring 24 thereby permitting the introduction of a pry off tool therebehind for the purpose of engaging the turned edge 19 and for forcibly prying the cover off of the wheel and out of engagement with the spring clips 20.

In Figures 3 and 4 I have illustrated a modification of the invention wherein the wheel parts 10 and 11 are substantially like that of the first form and are separated by space openings 12. As in the first form, a tire assembly 9 is carried on the tire rim 10 and the central body part 11 has a depressed central flange 13 for bolt-on connection with a part on an axle of the wheel.

Cooperable with this wheel is a modified form of cover 35 which includes an outer annular plastic ring 36 and a central metal hub cap simulating portion 37. The plastic ring 36 may be made of any suitable material as in the case of the plastic ring 16 and includes a turned outer edge 38 adapted to overhang an outer edge of the rim part 10 in the same manner as in the first form.

The ring 36 extends radially and axially inwardly to a turned inner margin which is formed into an annular bead 39 in which an outer annular bead 40 on the central metal portion 37 is nested. In other words, the inner edge of the plastic ring 36 is snapped over the outer edge of the metal hub cap portion 37 so that the two parts are thus connected together in a single unitary cover assembly. The junction of these two parts at the turned edges 39 and 40 comprise an annular shoulder for retaining cooperation with a plurality of spring clips 41, there being one for each of the wheel openings 12. Any suitable number of clips may be used, and since they are all identical a description of one will suffice. As shown in Figure 4, each clip includes an axially extending portion 42 terminating at its rear end in an inclined leg 43 adapted to be wedged between the rim and body part 10 and 11 in the wheel opening 12. This leg, as in the case of the end 32 of the clip 20, is adapted to be adapted to be wedged into gripping engagement with the parts to hold the clip in position.

In addition, the axially extending portion 42 of the clip is provided with a side flange 43 which is likewise adapted to be wedged in the wheel opening for the purpose of preventing cocking or tilting of the clip. Accordingly in this clip, as in the first form, the clip is solidly bottomed against the body part and is prevented from being cocked or tilted thereon by means of a side flange. As distinguished from the first form, I provide this clip 40 with an additional flange 44, which extends in an opposite direction from that of the flange 46, or in other words, extends toward the axis of the wheel. This flange 44 is of such construction as to embrace the outer surface of the body part 11, as shown in Figure 3, so as to limit inward axial movement of the clip relative to the body part.

The axially extending portion 42 terminates at the outer side of the wheel body part in a free turned extremity or finger 45, which includes an angular bend 46 adapted to be resiliently cammed outwardly upon engagement by the shoulder 39 of the cover. In this manner the cover can be cammed home against the body part 11 and wedged against the body part by the resilient pressure of the spring clip turned or angular portions 46. It will, of course, be appreciated that the spring fingers 45 are under tension by reason of the fact that once they have been cammed outwardly by the cover, they do not return to their normal positions as long as the shoulder 39 is in engagement therewith so that as a result they are constantly exerting their resilient pressure against the shoulder.

Removal of this form of cover may be effected in much the same manner as described above in the preferred form.

I claim as my invention:

1. In a cover structure for a wheel including tire rim and body parts, a circular cover for disposition on an outer side of the wheel having a shoulder, and cover retaining means between said wheel parts comprising a spring extending behind the cover and provided with a tang-like finger depressed therefrom toward the axis of the wheel for tensioned engagement with said shoulder, said cover comprising nested circular shells, one extending radially beyond the other to define said shoulder and an outer annular ring having a radially inner margin held between said nested shells.

2. In a cover structure for a wheel including tire rim and body parts, a circular cover for disposition on an outer side of the wheel having a shoulder, and cover retaining means carried by said wheel parts comprising a spring extending behind the cover and provided with a tang-like finger depressed therefrom toward the axis of the wheel for tensioned engagement with said shoulder, said cover comprising nested circular shells, one extending radially beyond the other to define said shoulder and an outer annular ring having a radially inner margin held between said nested shells, said outer ring being made of resiliently pliable material and said shells being made of relatively more rigid metallic material relative to which said ring is flexible.

3. In a cover structure for a wheel including tire rim and body parts and cover retaining means carried by said wheel, a circular cover for disposition over an outer side of said wheel, comprising nested central shells, one extending radially beyond the other to define a shoulder for retaining cooperation with said retaining means, and an outer annular ring having a radially inner margin engaged with said shells radially inward of said shoulder.

4. In a cover structure for a wheel including tire rim and body parts connected together at spaced intervals leaving wheel openings therebetween, cover retaining spring clips secured to said wheel in said openings and each having a resilient free end for cooperation with a cover, and a circular cover comprising a central metal circular member and an outer annular plastic member joined to said central circular member, said cover being provided at said junction with a shoulder for snap on engagement with said cover retaining clips, each of said spring clips including an inclined rear portion for wedging engagement with said wheel parts in an opening, as well as a side flange located entirely axially outwardly free of said rear portion extending into said opening for preventing cocking of the clip.

5. In a cover structure for a wheel including tire rim and body parts and cover retaining means carried by said wheel, a circular cover for disposition over an outer side of said wheel, comprising nested central shells, the inner of which extends radially beyond the outer to define a shoulder for retaining cooperation with said retaining means, and an outer annular ring having a radially inner margin engaged between said shells radially inwardly of said shoulder.

6. In a cover structure for a wheel, a pair of nested shells, a trim ring having the inner margin thereof clamped between the margins of the shells, and a bolt securing the shells together separably whereby the shells can be separated to release the trim ring margin.

7. In a wheel cover structure, a retaining spring clip comprising an elongated portion having the extremity thereof turned to provide a retaining flange extending sharply oblique thereto, said portion and flange being adapted to be inserted in a wheel opening with said flange wedgingly engaging between the opposing portions of the wheel defining the opening, a flange extending in a plane angular to said first mentioned flange and said portion and on the same side of said portion as said wedging flange for retaining the clip against tilting in the wheel opening, said portion being formed with a shoulder axially spaced from said flanges for engagement with a shoulder on the wheel to delimit the inward movement of the clip in said wheel opening, an extension of said portion outwardly beyond said shoulder having a resilient cover retaining tang struck out from the plane thereof toward the side toward which the shoulder is directed, said extension tilting away from said shoulder.

8. In a cover structure for a wheel including tire rim and body parts connected together at spaced intervals leaving wheel openings therebetween, cover retaining spring clips secured to said wheel in said openings and each having a resilient free end for cooperation with a cover, and a circular cover comprising a central metal circular member and an outer annular plastic member joined to said central circular member, said cover being provided at said junction with a shoulder for snap-on engagement with said cover retaining clips, each of said spring clips including an inclined rear portion for wedging engagement with said wheel parts in an opening, and also respectively oppositely extending side flanges, one of which extends into said opening for preventing tilting of the clip and the other of which engages the outer side of one of said wheels parts for delimiting axially inward movement of said clip.

9. In a retaining clip for use with a vehicle wheel having a wheel opening for securing a cover on the outer side of the wheel, a body portion having oppositely extending flanges at the respective opposite longitudinal sides thereof, one of which is adapted to hold the clip against tilting in the wheel opening and the other of which is adapted to engage one of the parts of the wheel at the wheel opening to delimit inward movement of the clip, one end of the body having a wedging flange adapted to engage within the wheel opening to retain the clip in place, the other end of the wheel body having a turned resilient cover retaining clip portion.

10. In combination in a wheel structure, a multi-flange tire rim having a base flange, a wheel body having a peripheral flange secured to the tire rim base flange and formed with wheel openings defined by inset flanges, a cover for the outer side of the wheel including central circular and trim ring members and having a retaining shoulder projecting generally radially outwardly behind the trim ring, and retaining clips for retaining the cover or the wheel including body portions secured in face-to-face relation to the respective flanges within said wheel openings and projecting outwardly beyond the wheel body behind the trim ring, the outwardly projecting part of the clip body portion having resilient retaining means overlying the wheel body and retainingly securing the shoulder portion of the cover in snap-on pry-off relation against the wheel body, and a side flange extending from the clip body portion radially outwardly into engagement with the tire rim base flange to hold the clip against movement away from the wheel body opening inset flange against which the respective clip engages.

11. In a wheel structure including a tire rim and a wheel body, the wheel body having a wheel opening at the tire rim defined by an inset flange, a wheel cover substantially covering the outer side of the wheel and including a circular inner cover member and a trim ring cover member with a generally radially outwardly extending shoulder adjacent juncture of the cover members and behind the inner margin of the trim ring cover member, said shoulder being disposed on the wheel body adjacent to the wheel opening, and a clip for securing the cover in snap-on pry-off relation on the wheel including a portion extending into the wheel opening and bearing facewise against the wheel opening flange and substantially secured against withdrawal from the opening, a portion of the clip extending axially outwardly beyond the wheel body and being turned generally radially outwardly behind the trim ring cover portion, said outwardly projecting portion of the clip having a tang struck therefrom and extending angularly inwardly toward the axis of the wheel and into retaining engagement with said cover shoulder.

GEORGE ALBERT LYON.

REFERENCES CITED

The following references are of record in the file of this patent:

UNITED STATES PATENTS

| Number | Name | Date |
|---|---|---|
| 1,884,238 | Reutter | Oct. 25, 1932 |
| 2,317,393 | Lyon | Apr. 27, 1943 |
| 2,368,235 | Lyon | Jan. 30, 1945 |